(12) United States Patent
Kikuchi

(10) Patent No.: US 9,405,491 B2
(45) Date of Patent: Aug. 2, 2016

(54) PRINTING APPARATUS, CONTROL METHOD IN PRINTING APPARATUS, AND STORAGE MEDIUM

(71) Applicant: CANON KABUSHIKI KAISHA, Tokyo (JP)

(72) Inventor: Shou Kikuchi, Kawasaki (JP)

(73) Assignee: Canon Kabushiki Kaisha, Toyko (JP)

( * ) Notice: Subject to any disclaimer, the term of this patent is extended or adjusted under 35 U.S.C. 154(b) by 0 days.

(21) Appl. No.: 14/701,348

(22) Filed: Apr. 30, 2015

(65) Prior Publication Data
US 2015/0317107 A1 Nov. 5, 2015

(30) Foreign Application Priority Data

May 2, 2014 (JP) ................................. 2014-095128
Mar. 9, 2015 (JP) ................................. 2015-046435

(51) Int. Cl.
*G06F 3/12* (2006.01)

(52) U.S. Cl.
CPC ............ *G06F 3/1229* (2013.01); *G06F 3/1267* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 7,148,985 | B2* | 12/2006 | Christodoulou | G06F 3/1204 358/1.13 |
| 9,019,522 | B2* | 4/2015 | Shibata | B41J 13/0018 358/1.14 |
| 2006/0044612 | A1* | 3/2006 | Kayama | G06F 3/1204 358/1.15 |
| 2007/0263242 | A1* | 11/2007 | Takahashi | G03G 15/6508 358/1.14 |
| 2011/0134460 | A1* | 6/2011 | Shibata | B41J 13/0018 358/1.14 |
| 2011/0242584 | A1* | 10/2011 | Igarashi | G06F 3/1205 358/1.15 |
| 2013/0242351 | A1* | 9/2013 | Seto | G06F 3/1296 358/3.29 |
| 2015/0015916 | A1* | 1/2015 | Kikuchi | G06K 15/1848 358/3.24 |

FOREIGN PATENT DOCUMENTS

JP 2006-099738 A 4/2006
JP 2007-301911 A 11/2007

* cited by examiner

*Primary Examiner* — Dung Tran
(74) *Attorney, Agent, or Firm* — Canon USA, Inc. IP Division

(57) ABSTRACT

A printing apparatus includes an obtaining unit, a storing unit, and a setting unit and is capable of communication with a print management server configured to be able to store delivery time information about a print product along with a print job. The obtaining unit obtains attribute information about a sheet specified by the print job stored in the print management server according to the delivery time information. The storing unit stores the attribute information about the sheet obtained by the obtaining unit. The setting unit sets the attribute information about the sheet stored in the storing unit as attribute information about a sheet held in a sheet holding unit of the printing apparatus.

7 Claims, 17 Drawing Sheets

FIG.6

| JOB ID | CUSTOMER NAME | JOB NAME | NUMBER OF SHEETS TO PRINT | SIZE | GRAMMAGE | COLOR | TYPE | DELIVERY DATE | DEVICE | STATUS |
|---|---|---|---|---|---|---|---|---|---|---|
| 250001 | 1001 | JobA | 50000 | A4 | 62g/m² | White | PLAIN PAPER | 10/29/2013 | DeviceA | STANDBY |
| 250002 | 1007 | JobA | 5000 | A4 | 80g/m² | Yellow | PLAIN PAPER | 10/29/2013 | DeviceA | STANDBY |
| 250003 | 2560 | JobB | 35000 | B5 | 62g/m² | White | PLAIN PAPER | 10/29/2013 | DeviceA | STANDBY |
| 250004 | 1003 | JobC | 5000 | A4 | 128g/m² | White | THICK PAPER | 10/29/2013 | DeviceA | STANDBY |
| 250005 | 3001 | JobD | 50000 | A4 | 80g/m² | White | PLAIN PAPER | 10/29/2013 | DeviceA | STANDBY |
| 250006 | 1013 | JobE | 25 | A4 | 100g/m² | Yellow | TAB SHEET | 10/29/2013 | DeviceA | STANDBY |
| 250007 | 1013 | JobE | 2000 | A4 | 80g/m² | White | PLAIN PAPER | 10/29/2013 | DeviceA | STANDBY |
| 250008 | 2988 | JobF | 500 | A3 | 128g/m² | White | THICK PAPER | 10/29/2013 | DeviceA | STANDBY |
| 250009 | 1013 | JobG | 20000 | A4 | 62g/m² | White | PLAIN PAPER | 10/30/2013 | DeviceA | STANDBY |
| 250010 | 3108 | JobH | 1000 | A4 | 80g/m² | Red | PLAIN PAPER | 10/30/2013 | DeviceA | STANDBY |
| ⋮ | ⋮ | ⋮ | ⋮ | ⋮ | ⋮ | ⋮ | ⋮ | ⋮ | ⋮ | ⋮ |

| SHEET ID | SIZE | GRAMMAGE | COLOR | TYPE |
|---|---|---|---|---|
| 001 | A4 | 62g/m$^2$ | White | PLAIN PAPER |
| 002 | A4 | 80g/m$^2$ | Yellow | PLAIN PAPER |
| 003 | B5 | 62g/m$^2$ | White | PLAIN PAPER |
| 004 | A4 | 128g/m$^2$ | White | THICK PAPER |
| 005 | A4 | 80g/m$^2$ | White | PLAIN PAPER |
| 006 | A4 | 100g/m$^2$ | Yellow | TAB SHEET |
| 007 | A3 | 128g/m$^2$ | White | THICK PAPER |

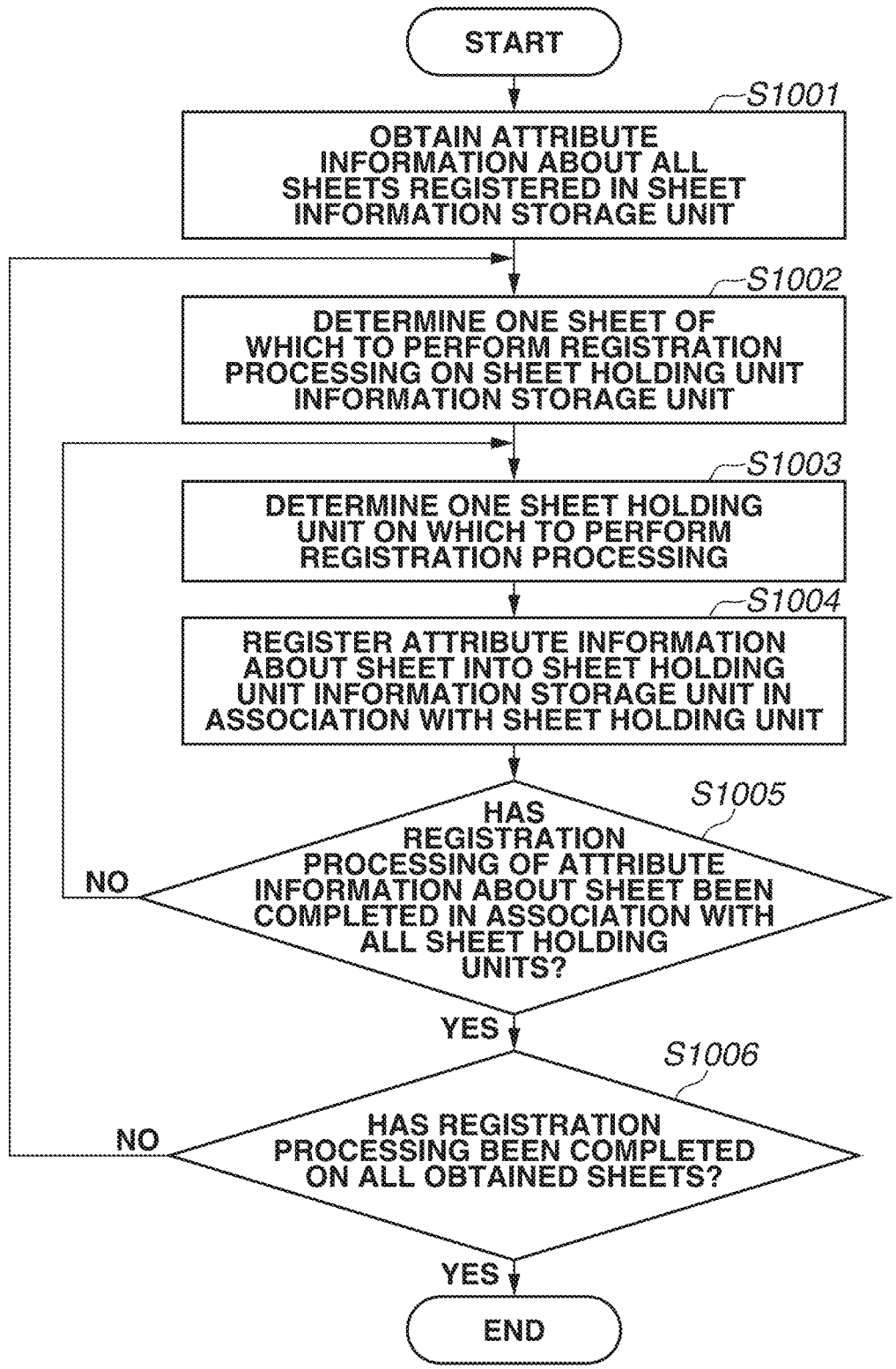

| SHEET HOLDING UNIT | SIZE | GRAMMAGE | COLOR | TYPE |
|---|---|---|---|---|
| Tray1 | A4 | 62g/m² | White | PLAIN PAPER |
| | A4 | 80g/m² | Yellow | PLAIN PAPER |
| | A4 | 128g/m² | White | THICK PAPER |
| | A4 | 80g/m² | White | PLAIN PAPER |
| | A4 | 100g/m² | Yellow | TAB SHEET |
| | B5 | 62g/m² | White | PLAIN PAPER |
| | A3 | 128g/m² | White | THICK PAPER |
| | | | | |
| Tray2 | A4 | 62g/m² | White | PLAIN PAPER |
| | A4 | 80g/m² | Yellow | PLAIN PAPER |
| | A4 | 128g/m² | White | THICK PAPER |
| | A4 | 80g/m² | White | PLAIN PAPER |
| | A4 | 100g/m² | Yellow | TAB SHEET |
| | B5 | 62g/m² | White | PLAIN PAPER |
| | A3 | 128g/m² | White | THICK PAPER |
| | | | | |
| Tray3 | A4 | 62g/m² | White | PLAIN PAPER |
| | A4 | 80g/m² | Yellow | PLAIN PAPER |
| | A4 | 128g/m² | White | THICK PAPER |
| | A4 | 80g/m² | White | PLAIN PAPER |
| | A4 | 100g/m² | Yellow | TAB SHEET |
| | B5 | 62g/m² | White | PLAIN PAPER |
| | A3 | 128g/m² | White | THICK PAPER |
| | | | | |
| Tray4 | A4 | 62g/m² | White | PLAIN PAPER |
| | A4 | 80g/m² | Yellow | PLAIN PAPER |
| | A4 | 128g/m² | White | THICK PAPER |
| | A4 | 80g/m² | White | PLAIN PAPER |
| | A4 | 100g/m² | Yellow | TAB SHEET |
| | B5 | 62g/m² | White | PLAIN PAPER |
| | A3 | 128g/m² | White | THICK PAPER |
| | | | | |

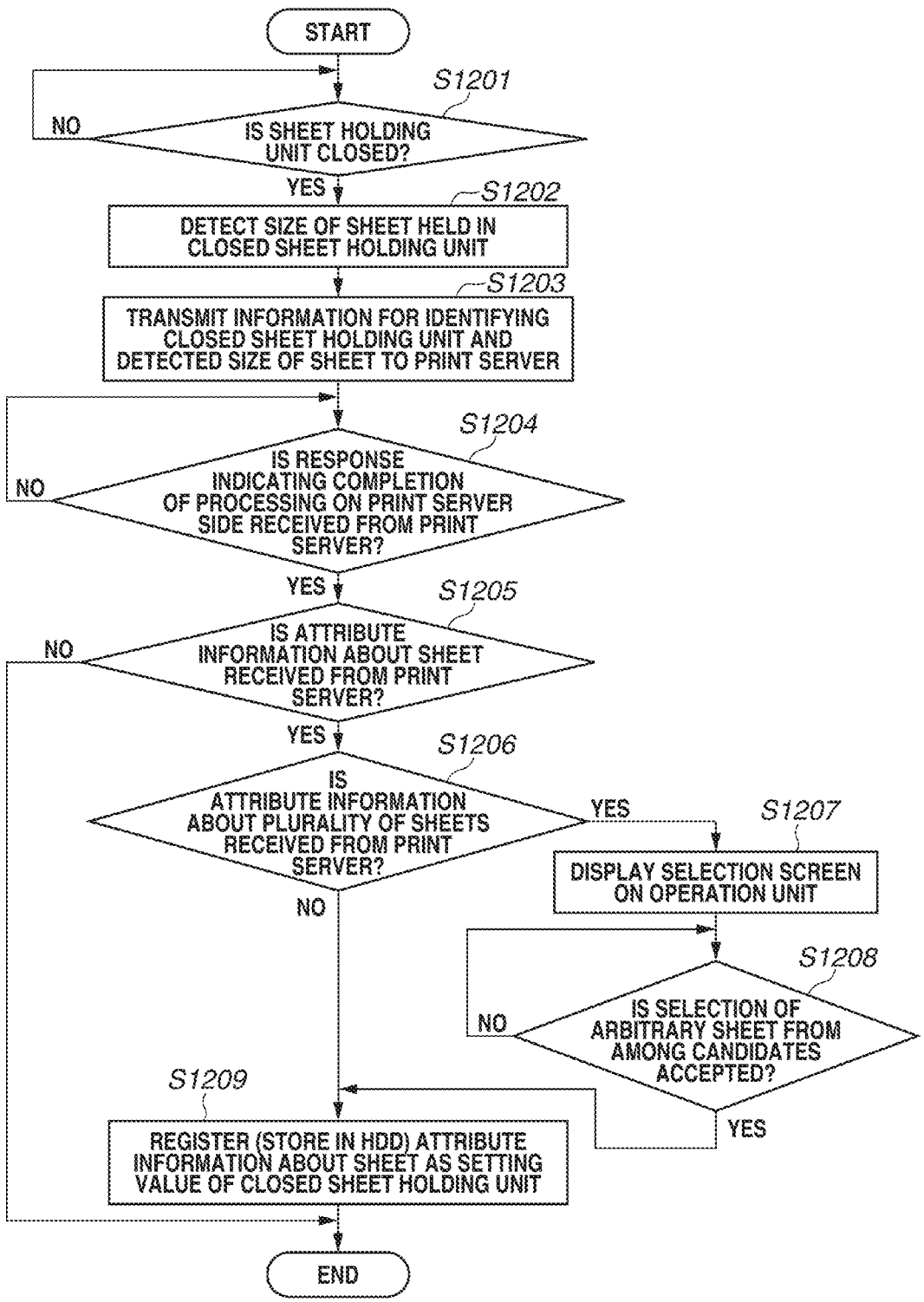

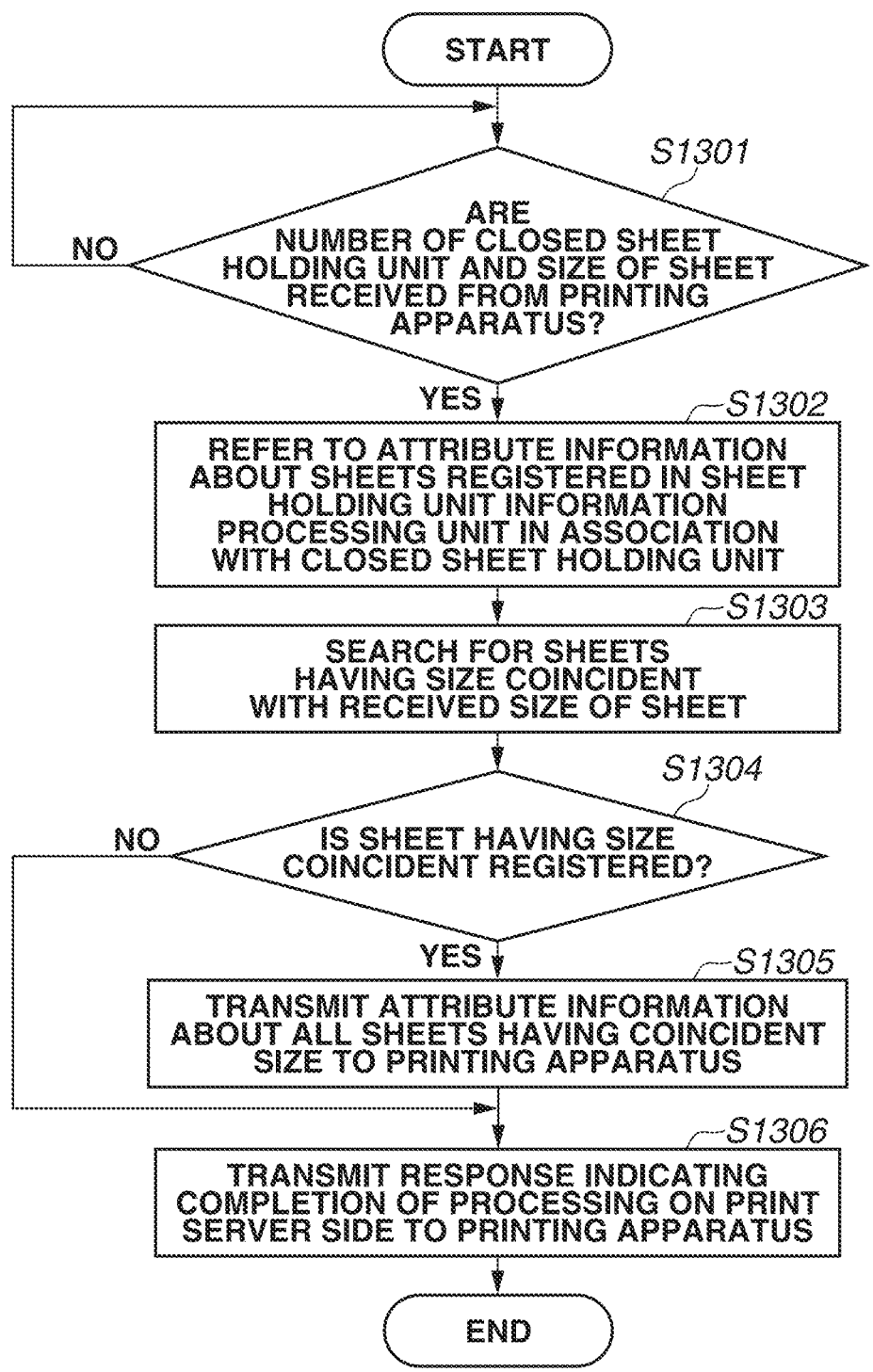

FIG.16

| SHEET ID | SIZE | GRAMMAGE | COLOR | TYPE |
|---|---|---|---|---|
| 001 | A4 | 80g/m$^2$ | White | PLAIN PAPER |
| 002 | B5 | 62g/m$^2$ | White | PLAIN PAPER |
| 003 | A3 | 128g/m$^2$ | White | THICK PAPER |

| SHEET HOLDING UNIT | SIZE | GRAMMAGE | COLOR | TYPE |
|---|---|---|---|---|
| Tray1 | A4 | 80g/m² | White | PLAIN PAPER |
| | B5 | 62g/m² | White | PLAIN PAPER |
| | A3 | 128g/m² | White | THICK PAPER |
| | | | | |
| Tray2 | A4 | 80g/m² | White | PLAIN PAPER |
| | B5 | 62g/m² | White | PLAIN PAPER |
| | A3 | 128g/m² | White | THICK PAPER |
| | | | | |
| Tray3 | A4 | 80g/m² | White | PLAIN PAPER |
| | B5 | 62g/m² | White | PLAIN PAPER |
| | A3 | 128g/m² | White | THICK PAPER |
| | | | | |
| Tray4 | A4 | 80g/m² | White | PLAIN PAPER |
| | B5 | 62g/m² | White | PLAIN PAPER |
| | A3 | 128g/m² | White | THICK PAPER |
| | | | | |

PRINTING APPARATUS, CONTROL METHOD IN PRINTING APPARATUS, AND STORAGE MEDIUM

BACKGROUND OF THE INVENTION

1. Field of the Invention

The present invention relates to a printing apparatus capable of communication with a print management server, a control method in the printing apparatus, and a storage medium.

2. Description of the Related Art

There is a print management server that receives a print job from an information processing apparatus such as a personal computer (PC), the print job specifying attribute information about a sheet to be used for printing, and reserves the received print job along with delivery time information about the sheet (print product) printed by execution of the print job (see Japanese Patent Application Laid-Open No. 2006-099738).

There is a sheet information database for a user to register attribute information (such as grammage, surface properties, shape, and color) about each sheet in advance. The user then selects the attribute information about a desired sheet from the sheet information database, and stores the attribute information as a setting value of a sheet holding unit (see Japanese Patent Application Laid-Open No. 2007-301911).

To execute a print job reserved in the print management server, the user needs to register the attribute information about the sheet specified by the print job into the sheet information database. For example, the user specifies attribute information about sheets for respective print jobs and transmits the print jobs to the print management server. To execute the print jobs reserved in the print management server, the user needs to register again the attribute information about the sheets specified for the respective print jobs into the sheet information database.

SUMMARY OF THE INVENTION

According to an aspect of the present invention, a printing apparatus, capable of communication with a print management server configured to be able to store delivery time information about a print product along with a print job, includes an obtaining unit configured to obtain attribute information about a sheet specified by the print job stored in the print management server according to the delivery time information, a storing unit configured to store the attribute information about the sheet obtained by the obtaining unit, and a setting unit configured to set the attribute information about the sheet stored in the storing unit as attribute information about a sheet held in a sheet holding unit of the printing apparatus.

In an example, a user specifies attribute information about sheets for respective print jobs and transmits the print jobs to a print management server. To execute the print jobs reserved in the print management server, the user needs to reregister the attribute information about the sheets specified for the respective print jobs into a sheet information database. A control method in a printing apparatus capable of communication with the print management server configured to be able to store delivery time information about a print product along with a print job includes obtaining attribute information about a sheet specified by the print job stored in the print management server according to the delivery time information, storing in a storing unit the obtained attribute information about the sheet, and setting the attribute information about the sheet stored in the storing unit as attribute information about a sheet held in a sheet holding unit of the printing apparatus. Further features of the present invention will become apparent from the following description of exemplary embodiments with reference to the attached drawings.

BRIEF DESCRIPTION OF THE DRAWINGS

FIG. 6 is a diagram for describing an example of a table according to the first exemplary embodiment.

FIG. 9 is a diagram for describing an example of a table according to the first exemplary embodiment.

FIG. 10 is a flowchart for describing an example of control according to the first exemplary embodiment.

FIG. 11 is a diagram for describing an example of a table according to the first exemplary embodiment.

FIG. 12 is a flowchart for describing an example of control according to the first exemplary embodiment.

FIG. 13 is a flowchart for describing an example of control according to the first exemplary embodiment.

FIG. 16 is a diagram for describing an example of a table according to the second exemplary embodiment.

FIG. 17 is a diagram for describing an example of a table according to the second exemplary embodiment.

DESCRIPTION OF THE EMBODIMENTS

Exemplary embodiments of the present invention will be described in detail below with reference to the accompanying drawings. It should be noted that the following exemplary embodiments are not intended to limit the present invention set forth in the claims, and all combinations of features described in the exemplary embodiments are not necessarily indispensable to the solving means of the present invention.

<Digital Printing System>

Figure 1:
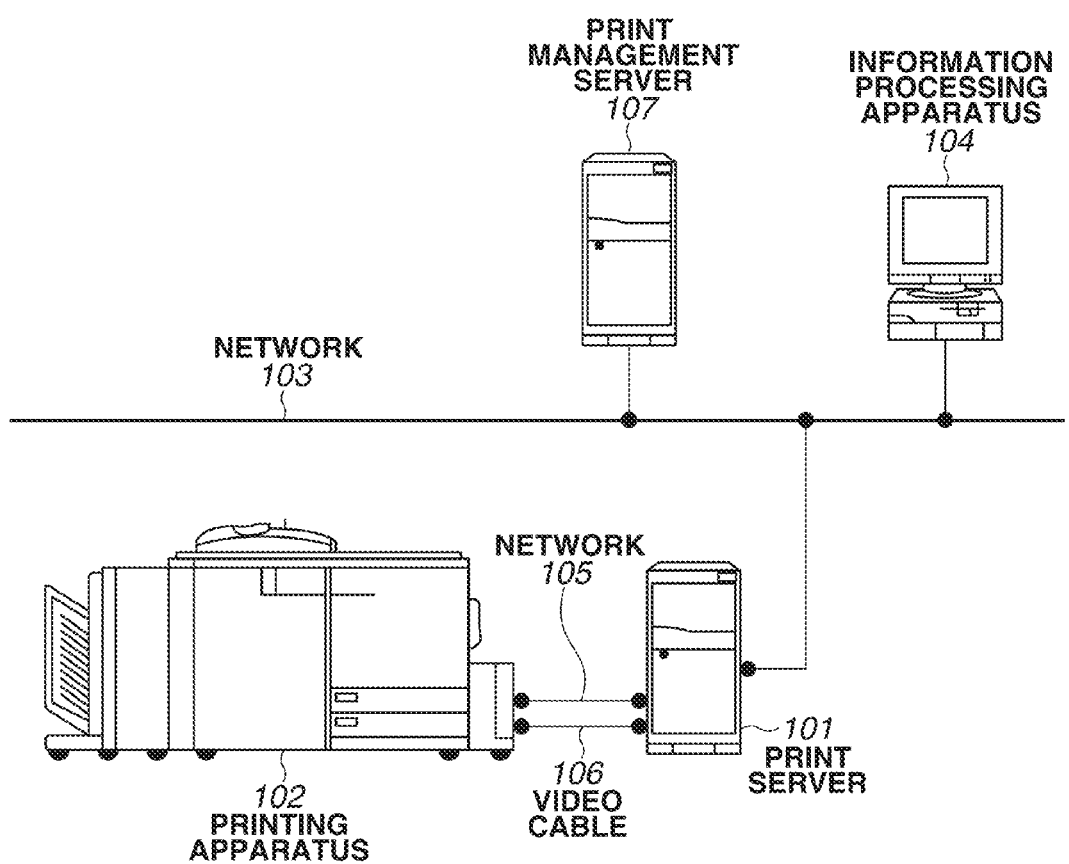
FIG. 1 is a diagram for describing a digital printing system according to a first exemplary embodiment of the present invention.

A digital printing system according to a first exemplary embodiment of the present invention will be described with reference to FIG. 1.

The digital printing system according to the first exemplary embodiment includes a printing apparatus 102 and a print server 101 capable of communication with the printing apparatus 102. The digital printing system further includes a print management server 107 capable of communication with the print server 101, and an information processing apparatus 104.

The print server 101 makes an inquiry about order information 507 managed by the print management server 107 to receive printing information about a specific print job registered in a printing information table 600. The print server 101 is configured to be able to automatically register the received printing information (for example, the size of and attribute information about a sheet used by the print job) in a sheet information storage unit 701.

A detailed description will be given below.

The digital printing machine (printing apparatus) 102 has various functions including scanning, printing, and copying.

The information processing apparatus (such as a computer) 104 has functions of editing an application file and issuing a print instruction.

The print server 101 has various functions including image processing, print control, and job management. For example, the print server 101 has a function of receiving a print job and analyzing a print setting of the received print job. The print server 101 then performs rasterization processing of image data to be printed based on the analyzed print setting of the print job. The print server 101 will be described in detail below with reference to FIG. 2.

The print management server 107 stores print jobs received from the information processing apparatus 104 into a storage unit (hard disk drive (HDD)). The print management server 107 manages printing information about the print jobs stored in the HDD (such as the names of customers who has submitted the print jobs, the names of the print jobs, the numbers of sheets to print, the sizes of and attribute information about the sheets used by the print jobs, and the delivery dates of the print jobs) in a centralized manner. The print management server 107 can thus store delivery time information about a sheet (print product) to be printed by the execution of a print job along with the print job. The print management server 107 also has a function of transmitting a print job stored in the HDD to the print server 101 according to a predetermined print schedule. The print management server 107 will be described in detail below with reference to FIG. 5.

The printing apparatus 102 and the print server 101 are connected via a network 105 and a video cable 106. The print server 101, the print management server 107, and the information processing apparatus 104 are communicably connected via a network 103 such as a local area network (LAN).

The video cable 106 is used to transfer an image to be printed. The network 105 is used to exchange other information. As long as the functions of an exemplary embodiment of the present invention can be performed, the network 103 used to connect the print server 101, the print management server 107, and the information processing apparatus 104 may be a network such as a wide area network (WAN) and a wireless LAN unless otherwise specified. The network 105 used to connect the printing apparatus 102 and the print server 101 may be a network such as a LAN and a WAN.

In the first exemplary embodiment of the present invention, the information processing apparatus 104 exchanges various types of data with the printing apparatus 102 via the print server 101 and the print management server 107. For example, the print management server 107 processes a print job received from the information processing apparatus 104 connected via the network 103, and transmits the print job to the print server 101. The print server 101 processes the print job received from the print management server 107 connected via the network 103, and transmits the print job to the printing apparatus 102. The print server 101 may process a print job received from the information processing apparatus 104 and transmit the print job to the printing apparatus 102.

A user can directly operate the information processing apparatus 104 to check the status of a print job and the statuses of the print server 101, the print management server 107, and the printing apparatus 102. The user can directly or remotely operate the print server 101 to store attribute information about a sheet into, for example, a storage unit (HDD) included in the printing apparatus 102 as a setting value of a sheet holding unit of the printing apparatus 102.

If the information processing apparatus 104 plays the role of the print server 101 and/or the print management server 107, the information processing apparatus 104 may directly exchange data and commands with the printing apparatus 102. In such a case, the information processing apparatus 104 has a configuration similar to that of the print server 101 and/or the print management server 107 except for the connection with the printing apparatus 102 via the network 105 and the video cable 106.

<Configuration of Print Server>

Figure 2:
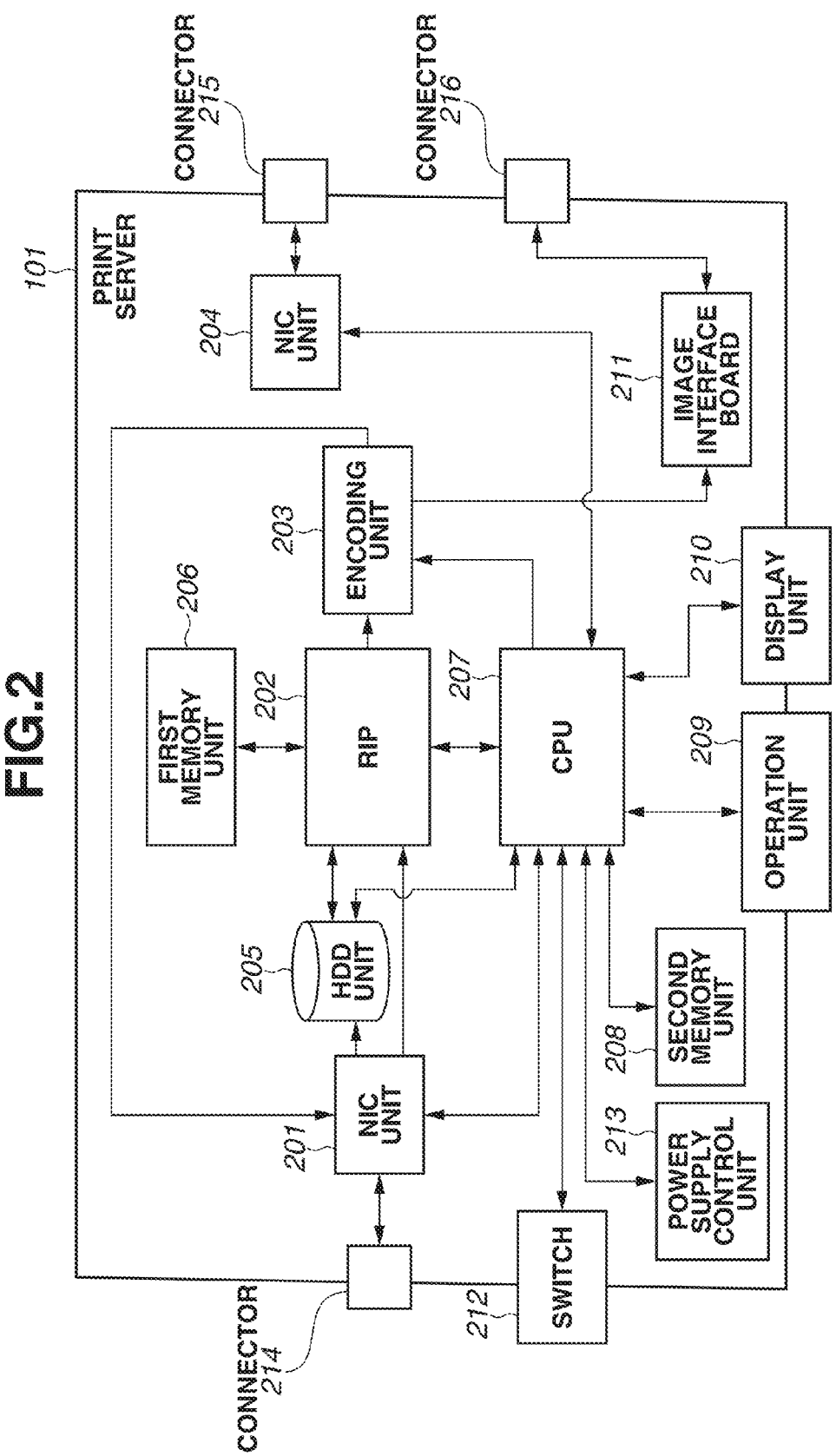
FIG. 2 is a block diagram illustrating a configuration of a print server according to the first exemplary embodiment.

An example of a configuration of the print server 101 according to the first exemplary embodiment of the present invention will be described with reference to FIG. 2.

A network interface card (NIC) unit 201 is a first network interface which controls communication performed via the network 103. A NIC unit 204 is a second network interface which controls communication performed via the network 105. The NIC units 201 and 204 may control communication performed via a wireless LAN.

A raster image processor (RIP) 202 renders a print language such as page description language (PDL) data or a specific data format received by the NIC unit 201 into a raster image. An encoding unit 203 converts the data rendered as a raster image into a form of print data or a data format supported by the printing apparatus 102.

An HDD unit 205 serving as a storage unit temporarily stores (spools) PDL data received by the NIC unit 201 or temporarily stores compressed data subjected to RIP processing. Data stored in the sheet information storage unit 701 in FIG. 7, data stored in a sheet holding unit information storage unit 702 in FIG. 7, and system software intended for various types of processing to be described below are stored in the HDD unit 205.

The data stored in the sheet information storage unit 701 and the sheet holding unit information storage unit 702 may be stored in a nonvolatile memory such as a solid state drive (SSD) instead of the HDD unit 205.

A central processing unit (CPU) 207 controls processing and operation of various units included in the print server 101. A first memory unit 206 is used for the RIP 202 to perform image rasterization processing. A second memory unit 208 is used by the CPU 207 as a temporary data storage area.

An operation unit 209 includes a button, a key, and a touch panel. The operation unit 209 is used to perform operations of the print server 101. A display unit 210 displays images and text to convey information to the user. An image interface board 211 and a connector 216 intended for the image interface board 211 are used to generate and transfer image data to a dedicated transmission path. A switch 212 receives the user's operations for shutdown and power-on. If the switch 212 is operated, an interrupt occurs to the CPU 207. When the interrupt is detected, the CPU 207 controls a power supply control unit 213 according to the circumstances.

Data packets from the information processing apparatus 104 or the print management server 107 to the print server 101 are propagated through the network 103 and taken into the print server 101 via a connector 214. In the print server 101, the NIC unit 201 receives data. If print data is received, the CPU 207 performs control to write the received data to the HDD unit 205 as needed. Such writing is referred to as queuing (spooling), which is commonly performed for the purpose of improving the data transfer rate. The data stored in the HDD unit 205 is read by the RIP 202 according to instructions from the CPU 207.

The encoding unit 203 functioning as a data formation conversion unit then performs encoding into a data format capable of interpreting by the printing apparatus 102 based on the data format capable of interpreting by the printing apparatus 102, which is set in advance, and the format of the received data. The encoded data needs to be in a format capable of interpreting by the printing apparatus 102. The format depends on the ability of an interpretation unit built in the printing apparatus 102. Examples of the format include a specific print language format and a data format compressed by a specific method such as Joint Bi-level Image Experts Group (JBIG). To transmit such encoded data to the network 105, the NIC unit 204 packetizes the encoded data into data packets again, and the data packets are transmitted from a connector 215. The data packets are transmitted to the printing apparatus 102 via the network 105.

The encoded data may be transmitted to the printing apparatus 102 by using a local interface such as Universal Serial Bus (USB). The printing apparatus 102 receives the data packets and performs print processing on a recording medium such as a sheet according to its own print processing procedure.

As another data transfer method, the data may be transferred to the image interface board 211 via the encoding unit 203 and transmitted from the connector 216. The data is then transmitted to the printing apparatus 102 via the video cable 106. The information processing apparatus 104 and the print management server 107 obtain states of the print server 101 and the printing apparatus 102 in a timely manner. Examples of the states include a power supply state of the print server 101 and the printing apparatus 102 and a state of whether the print server 101 and the printing apparatus 102 are in a normal activation state. The information processing apparatus 104 and the print management server 107 determine the obtained power states and activation states, and transmit the data packets to the print server 101. The information processing apparatus 104 and the print management server 107 perform polling to obtain the power supply states and the activation states of the print server 101 and the printing apparatus 102 at regular time intervals. The power supply state and the activation state of the printing apparatus 102 are obtained via the print server 101. If a state change notification packet transmitted from the print server 101 or the printing apparatus 102 is obtained, the information processing apparatus 104 and the print management server 107 change their processings. For example, the printing apparatus 102 transmits a power supply state notification packet when shutting down. On receiving the power supply state notification packet, the information processing apparatus 104 and the print management server 107 can stop polling to avoid useless traffic on the networks 103 and 105.

<Configuration of Printing Apparatus>

An example of a configuration of the printing apparatus 102 according to the first exemplary embodiment of the present invention will be described with reference to FIG. 3.

The printing apparatus 102 is connected to a scanner 320 serving as an image input device and a printer engine 301 serving as an image output device, and performs control for reading image data and making a print output. The printing apparatus 102 is also connected with the network 105, a telephone line, and the video cable 106 to perform control for inputting and outputting image information and device information via the network 105 and the video cable 106.

A CPU 302 is a central processing unit for controlling the entire printing apparatus 102. A random access memory (RAM) 303 is a system work memory for the CPU 302 to operate. The RAM 303 also serves as an image memory for temporarily storing input image data. A read-only memory (ROM) 307 is a boot ROM in which a system boot program is stored.

An HDD 308 stores system software for various types of processing to be described below and input image data. The HDD 308 also stores setting information from an operation unit 318, setting information received from the print server 101, and attribute information such as the size of a sheet held in a sheet holding unit 322. The printing apparatus 102 includes a plurality of sheet holding units 322 which include a sheet feed tray (sheet cassette) and a manual feed tray. The system software for various types of processing and the input image data may be stored in a nonvolatile memory such as an SSD instead of the HDD 308.

An operation unit interface (I/F) 304 is an interface unit for the operation unit 318 which includes a screen capable of displaying image data. The operation unit I/F 304 outputs operation screen data to the operation unit 318. The operation unit I/F 304 also functions to transmit information input from the operation unit 318 by the user to the CPU 302. The operation unit 318 includes a non-illustrated touch panel unit and key input unit. The operation unit 318 provides various interfaces when the user makes various settings and operations on the printing apparatus 102 according to the first exemplary embodiment. A network I/F 305 is implemented, for example, by a LAN card. The network I/F 305 connects to the network 105 and inputs and outputs information from/to an external apparatus. The input and output of information between the printing apparatus 102 and the external apparatus is not limited to a network such as a LAN and a WAN, and may be performed via a wireless LAN. A modem 306 connects to the telephone line and inputs and outputs information from/to an external apparatus. A video I/F 324 connects to the video cable 106 and inputs and outputs information from/to an external apparatus.

Such units are arranged on a system bus 323.

An image bus I/F 309 is an interface for connecting the system bus 323 and an image bus 319. The image bus I/F 309 is a bus bridge which converts data structures. The image bus 319 transfers image data at high speed. An RIP 311, a device I/F 312, a scanner image processing unit 313, a printer image processing unit 314, and an image edit processing unit 315 are connected to the image bus 319. The RIP 311 rasterizes a PDL into a raster image.

The device I/F 312 transfers image data input from the scanner 320 to the HDD 308. The device I/F 312 also transfers image data to the printer engine 301. In an exemplary embodiment, image data input from the scanner 320 may be transferred to the HDD 308 according to instructions from the 302 without the intervention of the device I/F 312. Similarly, in another exemplary embodiment, image data may be transferred to the printer engine 301 according to instructions from the CPU 302 without the intervention of the device I/F 312. The scanner image processing unit 313 performs various types of processing, such as correction, on the image data input from the scanner 320. The printer image processing unit 314 performs processing, such as correction and resolution conversion corresponding to the printer engine 301, on image data to be printed for output. The image edit processing unit 315 performs various types of image processing such as rotation of image data and compression/decompression of image data.

A switch 317 accepts the user's operations for shutdown and power-on. If the switch 317 is operated, a power supply control unit 316 causes an interrupt to the CPU 302. On detecting the interrupt, the CPU 302 controls the power supply control unit 316 according to the circumstances.

The sheet holding units 322 each include a size detection sensor 325 and an opening/closing detection sensor 326. The size detection sensor 325 detects the size of a sheet held in the sheet holding unit 322. The opening/closing detection sensor 326 detects an opening/closing operation of the sheet holding unit 322.

Figure 4A:
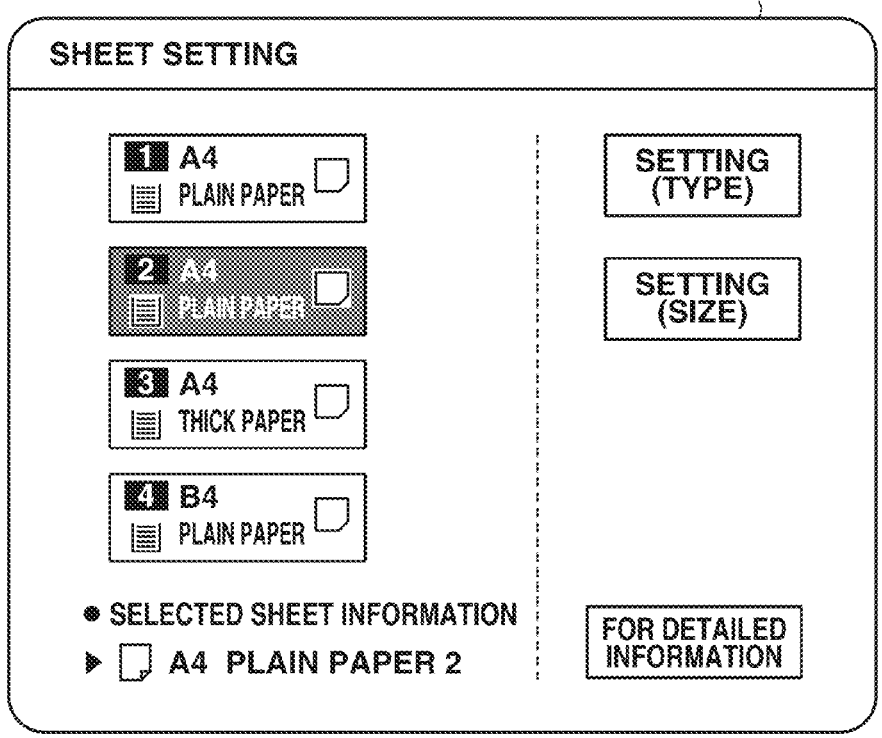
FIGS. 4A and 4B are diagrams for describing a screen according to the first exemplary embodiment.

The size of a sheet held in the sheet holding unit 322 may be obtained by accepting the user's input from the operation unit 318 of the printing apparatus 102. The size may be imported from an external apparatus such as the information processing apparatus 104. For example, by using a setting screen 400 in FIG. 4A displayed on the operation unit 318, the user can store attribute information about a sheet held in each sheet holding unit 322 (the size and type of the sheet) as a setting value of the sheet holding unit 322.

Figure 4B:
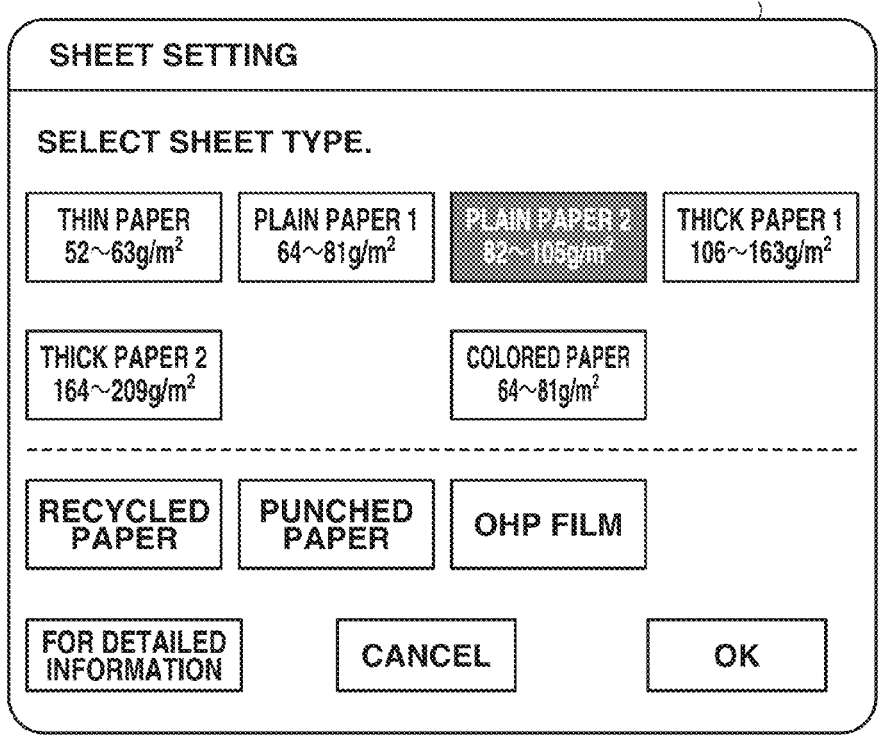

The sheet holding units 322 each may further include sensors other than the size detection sensor 325. Examples include a sensor for detecting the amount of sheets remaining in the sheet holding unit 322, and a sensor for detecting the color or surface properties of a sheet held in the sheet holding unit 322. The color and surface properties of the sheet held in the sheet holding unit 322 may be obtained by accepting the user's input from the operation unit 318 of the printing apparatus 102. The color and surface properties may be imported from an external apparatus such as the information processing apparatus 104. For example, by using a setting screen 410 in FIG. 4B displayed on the operation unit 318, the user can store the type of the sheet (the type and grammage of the sheet) as a setting value of an arbitrary sheet holding unit 322.

A sheet holding unit control unit 321 is a module that stores the attribute information about the sheets as the setting values of the sheet holding units 322 of the printing apparatus 102, and controls feeding of the sheets. The printing apparatus 102 controls printing based on the attribute information about the sheets, stored as the setting values of the sheet holding units 322. Examples of the attribute information about a sheet include information about the size, grammage, color, and type of the sheet. The printing apparatus 102 uses such information for printing.

For example, the printing apparatus 102 determines the sheet holding unit 322 from which sheets are fed based on the size of a sheet used by a print job at the time of printing, and performs control to feed sheets from the determined sheet holding unit 322. The printing apparatus 102 controls temperature of a fixing unit and conveyance speed of the sheet based on the grammage of the sheet. The printing apparatus 102 may control the temperature of the fixing unit and the conveyance speed of the sheet based on the type of the sheet. The sheet holding unit control unit 321 obtains the information about the opening/closing operations of the sheet holding units 322 from the opening/closing detection sensors 326, and detects whether an opened sheet holding unit 322 is closed.

<Configuration of Print Management Program>

The print management server 107 according to the first exemplary embodiment of the present invention will be described in detail below.

Figure 5:
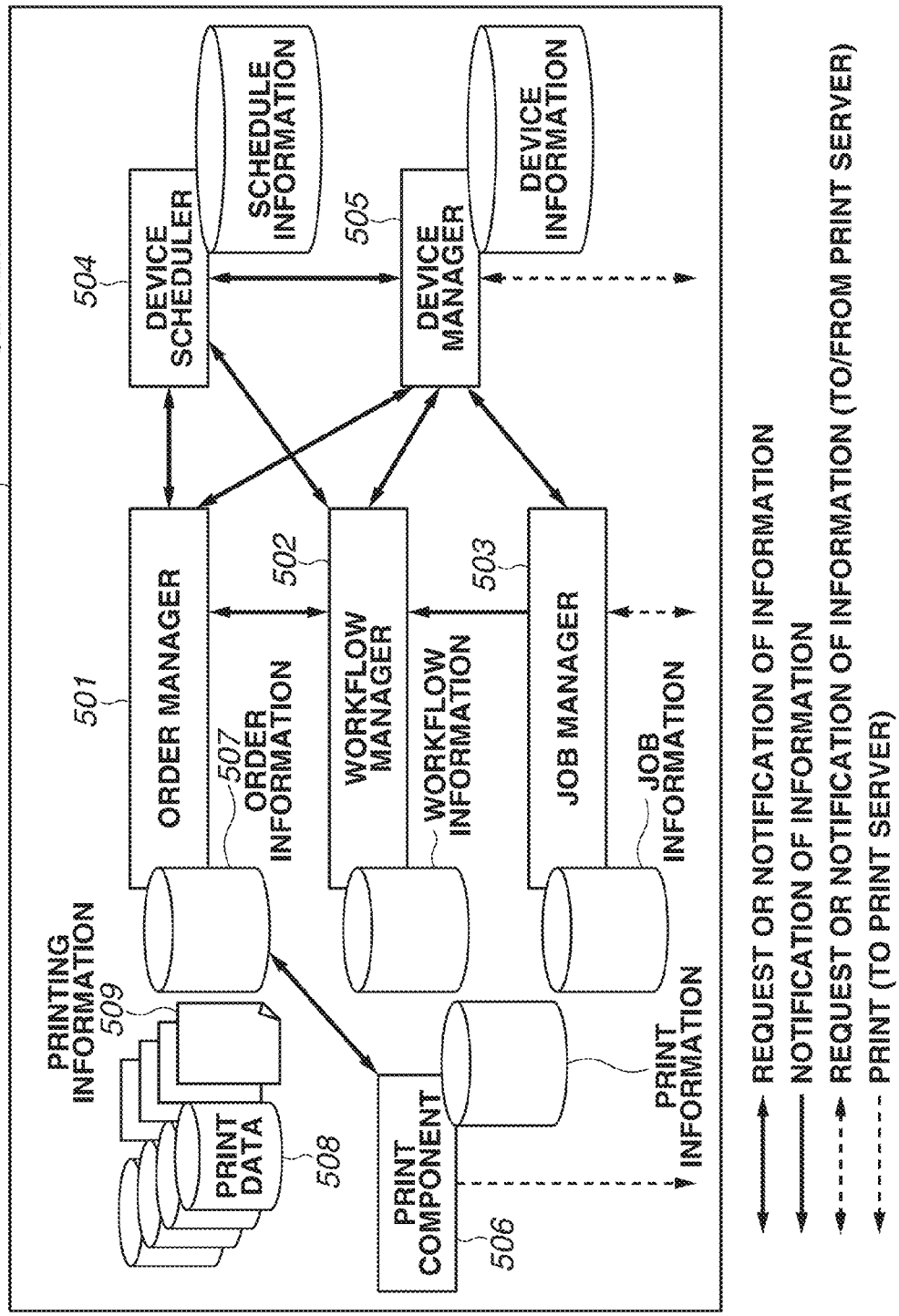
FIG. 5 is a block diagram illustrating a configuration of a print management program according to the first exemplary embodiment.

Initially, an example of a configuration of a print management program running on the print management server 107 will be described for each functional module with reference to FIG. 5.

The print management program includes an order manager 501, a workflow manager 502, a job manager 503, a device scheduler 504, and a device manager 505 as main components running on the print management server 107.

The order manager 501 is a component that manages print requests submitted from the information processing apparatus 104 which is connected via the network 103. The order manager 501 analyzes a print job received from the information processing apparatus 104 to extract print data 508 and printing information 509.

For example, the printing information 509 includes the name of a customer who has submitted the print job, the name of the print job, the number of sheets to print, the size of and attribute information about a sheet used by the print job, and the delivery date of the print job. The order manager 501 generates a file of order information 507 needed for printing based on the extracted print data 508 and printing information 509. The order manager 501 stores the generated file of the order information 507 as a storage area in a non-illustrated nonvolatile memory of the print management server 107.

The workflow manager 502 is a component that manages a flow of print processing (workflow) related to each print request submitted from the information processing apparatus 104. The user can generate a workflow for each order according to the order information 507 managed by the order manager 501. The workflow manager 502 can activate a print component 506 to be described below.

The job manager 503 is a component that manages print jobs. According to a start of printing, the job manager 503 communicates with the print server 101 to monitor print jobs. The user can access the job manager 503 from the information processing apparatus 104. The user can thus obtain the state of a print job in process and control print jobs.

The device scheduler 504 is a component that manages operation reservations (operation schedule or schedule) of the printing apparatus 102. The user can generate a print schedule of the printing apparatus 102 by using the device scheduler 504.

The device manager 505 is a component that manages the printing apparatus 102 which performs the print processing.

The print component 506 is a component that transmits a print job managed by the job manager 503 to the print server 101. The print component 506 obtains the print data 508 and the printing information 509 registered in the order information 507 managed by the order manager 501. The print component 506 then transmits the print job to the print server 101 according to the print schedule generated by the device scheduler 504.

The device scheduler 504, the workflow manager 502, and the print component 506 are programs that can communicate with each other. Part of the functions of the device scheduler 504, the workflow manager 502, and the printer component 506 may be performed by the user. For example, the user may operate the workflow manager 502 to manage the progress of a workflow based on schedule information managed by the device scheduler 504.

An operation program (including a graphical user interface (GUI)) for operating the foregoing components via the network 103 such as a LAN is installed on the information processing apparatus 104. The user can thus operate the print management program from the information processing apparatus 104 by using the operation program. While FIG. 5 illustrates an example of the arrangement of the print management program, the print management program is not limited to such a configuration. For example, the print management program and the operation program may be configured to run on on a single information processing apparatus 104. For example, the components of the print management program may be configured to be distributed to and run on a plurality of information processing apparatuses 104. For example, the operation program may be configured to run on a plurality of information processing apparatuses 104 so that a plurality of users can simultaneously perform print management work.

As described above, the digital printing system according to the first exemplary embodiment of the present invention includes the print management server 107 and the print server 101.

The print management server 107 manages printing information 509 (order information 507) about all print jobs received from the information processing apparatus 104 in a centralized manner within the print management server 107. The following description will be given on the assumption that a printing information table 600 illustrated in FIG. 6 is stored as a storage area in the non-illustrated nonvolatile memory of the print management server 107.

As illustrated in the printing information table 600 in FIG. 6, for example, the printing information 509 about a print job having a job identifier (ID)=250001 includes a customer name "1001," a job name "JobA," the number of sheets to print "50000 sheets," and a delivery date (delivery time information) "Oct. 29, 2013." The sheet to be used by the job is "size: A4, grammage: 62 g/m$^2$, color: white, and type: plain paper."

Figure 7:
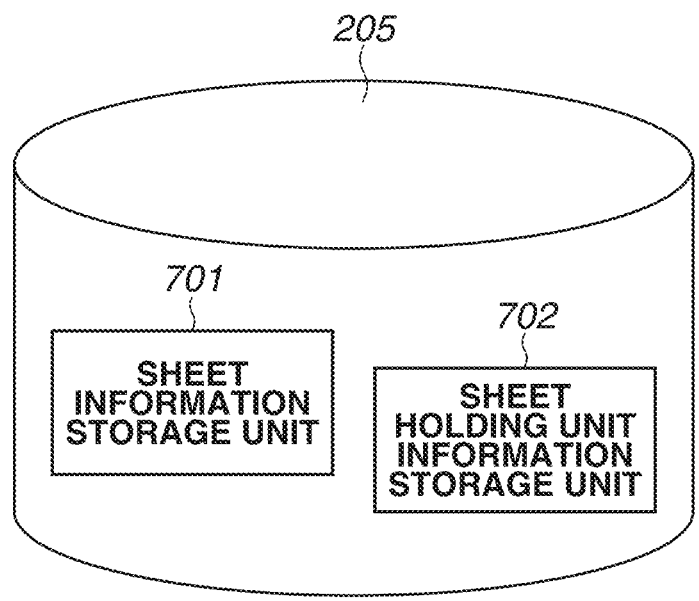
FIG. 7 is a diagram for describing data of a hard disk drive (HDD) unit of the print server according to the first exemplary embodiment.

As illustrated in FIG. 7, the HDD unit 205 of the print server 101 includes the sheet information storage unit 701 and the sheet holding unit information storage unit 702.

As illustrated in a sheet information table 900 in FIG. 9, the sheet information storage unit 701 stores attribute information about sheets in a list form. Examples of the attribute information about a sheet registered in the sheet information table 900 include the ID, size, grammage, color, and type of the sheet. Examples of sheets to be registered in the sheet information storage unit 701 include a sheet that is used as a standard, a sheet that is evaluated by a printer maker, and a user-defined sheet which is a standard sheet or an evaluated sheet customized by the user.

As illustrated in a sheet holding unit information table 1100 in FIG. 11, the sheet holding unit information storage unit 702 stores the attribute information about the sheets in a list form in association with each of the sheet holding units 322. Examples of the attribute information about a sheet registered in the sheet holding unit information storage unit 702 include the size, grammage, color, and type of the sheet. The sheets registered in the sheet holding unit information storage unit 702 are desired sheets frequently used by the user, registered in association with the specific sheet holding units 322 among the sheets registered in the sheet information storage unit 701.

The attribute information about the sheets stored in the printing information table 600 in FIG. 6 is set as the attribute information about the sheets held in the sheet holding units 322 of the printing apparatus 102 according to operations accepted via the operation unit 318 of the printing apparatus 102.

As will be described below with reference to FIGS. 12 and 13, the attribute information about the sheets stored in the printing information table 600 in FIG. 6 can also be set as the attribute information about the sheets held in the sheet holding units 322 of the printing apparatus 102 according to closing of the sheet holding units 322.

For example, attribute information about a sheet like "size: A4, grammage: 62 g/m$^2$, color: white, and type: plain paper" is added to a print job registered in the print management server 107. Despite the presence of such attribute information about the sheets in the print management server 107, the user has conventionally needed to manually register the attribute information about the sheet specified by the print job into the print server 101. The more the types of parameters (for example, the size, grammage, color, and type of a sheet) included in the attribute information about a sheet specified by a print job, the more troublesome it is for the user to manually register the attribute information.

To reduce such troubles, the present exemplary embodiment is configured to be able to copy and transfer the attribute information about the sheets registered in the print management server 107 (for example, size: A4, grammage: 62 g/m$^2$, color: white, and type: plain paper) to the print server 101.

A detailed description will be given below.

In an exemplary embodiment, the sheet information storage unit 701 or the sheet holding unit information storage unit 702 may be stored as a storage area in the HDD 308 of the printing apparatus 102 instead of the HDD unit 205 of the print server 101. In another exemplary embodiment, the sheet information storage unit 701 or the sheet holding unit information storage unit 702 may be stored as a storage area in a nonvolatile memory of the print management server 107 or the information processing apparatus 104. In such cases, the data stored in the sheet information storage unit 701 and the sheet holding unit information storage unit 702 may be referred to via the network 103 such as a LAN.

Figure 8:
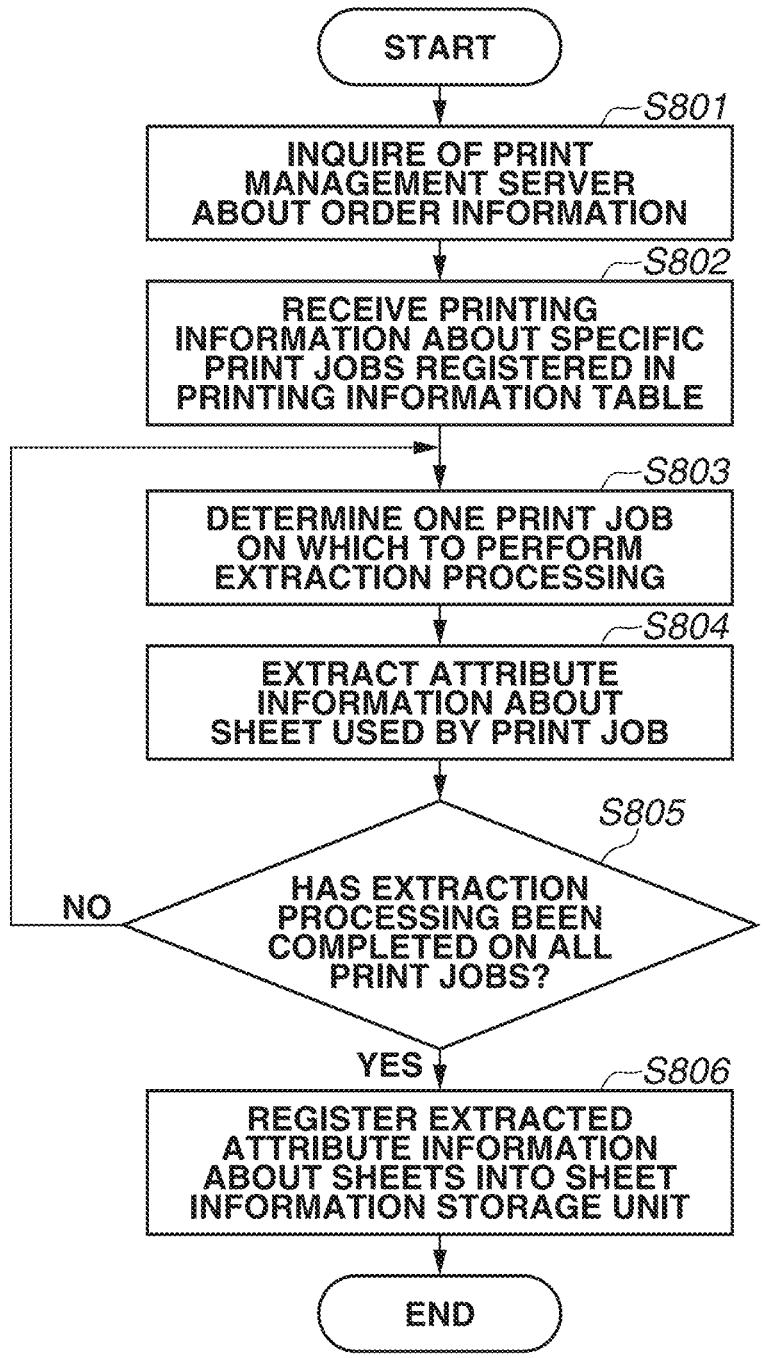
FIG. 8 is a flowchart for describing an example of control according to the first exemplary embodiment.

Now, processing for registering attribute information about sheets into the sheet information storage unit 701 will be described with reference to a flowchart illustrated in FIG. 8. The processing in FIGS. 8, 10, and 13 runs on the side of the print server 101. The CPU 207 executes a program read from the HDD unit 205 and loaded into the second memory unit 208, whereby the processing in FIGS. 8, 10, and 13 is performed. While the first exemplary embodiment of the present invention deals with the case where the processing in FIGS. 8, 10, and 13 runs on the side of the print server 101, the processing in FIGS. 8, 10, and 13 may run on the side of the printing apparatus 102. If the processing runs on the side of the printing apparatus 102, the CPU 302 executes a program read from the HDD 308 and loaded into the RAM 303 to perform the processing. If the print management server 107 or the information processing apparatus 104 plays the role of the print server 101, the processing may run on the side of the print management server 107 or the information processing apparatus 104. The processing in FIG. 8 is started if the print management server 107 and the printer server 101 can communicate with each other via the network 103 such as a LAN.

In step S801, the CPU 207 inquires of the print management server 107 about the order information 507. The processing proceeds to step S802.

In step S802, the CPU 207 receives the printing information 509 about specific jobs registered in the printing information table 600 (for example, print jobs corresponding to a delivery date specified by the user, a customer name specified by the user, and/or a device specified by the user). The processing proceeds to step S803.

The printing information table 600 is stored as a storage area in the nonvolatile memory of the print management server 107. Examples of the printing information 509 received in step S802 include the size of and attribute information about a sheet used by a print job and the number of sheets to print. In step S803, the CPU 207 determines one print job on which extraction processing of step S804 is performed, among the print jobs received in step S802. The processing proceeds to step S804.

In step S804, the CPU 207 extracts the attribute information about the sheet used by the print job determined in step S803 (the size, grammage, color, and type of the sheet). The processing proceeds to step S805.

In step S805, the CPU 207 determines whether the extraction processing of step S804 has been completed on all the print jobs received in step S802. If it is determined that the extraction processing has been completed (YES in step S805), the processing proceeds to step S806. On the other hand, if it is determined that the extraction processing has not been completed (NO in step S805), the processing returns to step S803. The CPU 207 then proceeds with the subsequent processing.

In step S806, the CPU 207 registers the attribute information about the sheets (the sizes, grammage, color, and types of the sheets) extracted in step S804 into the sheet information storage unit 701 in FIG. 7. After the processing of step S806, the series of processings according to FIG. 8 ends.

The above is the details of the series of processings by which the print server 101 according to the first exemplary embodiment registers the attribute information about the sheets into the sheet information storage unit 701. If the processing is performed on the side of the printing apparatus 102, the processing can be described in a manner similar to when the processing is performed on the print server 101 by the following rephrasing. That is, the "CPU 207" and the "HDD unit 205" of the print server 101 are rephrased as the "CPU 302" and the "HDD 308" of the printing apparatus 102, respectively.

Next, processing for registering attribute information about sheets into the sheet holding unit information storage unit 702 in association with the sheet holding units 322 will be described with reference to a flowchart illustrated in FIG. 10. The processing in FIG. 10 started according to a reference to the sheet information storage unit 701 in FIG. 7 stored in the HDD unit 205.

In step S1001, the CPU 207 obtains the attribute information about all the sheets registered in the sheet information storage unit 701. The processing proceeds to step S1002.

In step S1002, the CPU 207 determines one sheet on which registration processing on the sheet holding unit information storage unit 702 in FIG. 7 is performed, among the sheets obtained in step S1001. The processing proceeds to step S1003.

In step S1003, the CPU 207 determines one of the sheet holding units 322 on which registration processing of step S1004 is to register the attribute information about the sheet determined in step S1002 in association with the sheet holding unit 322. The processing proceeds to step S1004. In step S1004, the CPU 207 registers the attribute information about the sheet determined in step S1002 into the sheet holding unit information storage unit 702 in association with the sheet holding unit 322 determined in step S1003. The processing proceeds to step S1005.

In step S1005, the CPU 207 determines whether the registration processing of the attribute information about the sheet determined in step S1002 has been completed in association with all the sheet holding units 322. If it is determined that the registration processing has been completed (YES in step S1005), the processing proceeds to step S1006. On the other hand, if it is determined that the registration processing has not been completed (NO in step S1005), the processing returns to step S1003. The CPU 207 then proceeds with the subsequent processing.

In step S1006, the CPU 207 determines whether the registration processing of step S1004 has been completed on all the sheets obtained in step S1001. If it is determined that the registration processing has been completed (YES in step S1006), the series of processings according to FIG. 10 ends. On the other hand, if it is determined that the registration processing has not been completed (NO in step S1006), the processing returns to step S1002. The CPU 207 then proceeds with the subsequent processing.

The above is the details of the series of processings by which the print server 101 according to the first exemplary embodiment registers the attribute information about the sheets into the sheet holding unit information storage unit 702 in association with the sheet holding units 322. If the processing is performed on the side of the printing apparatus 102, the processing can be described in a manner similar to when the processing is performed on the side of the print server 101 by the following rephrasing. That is, the "CPU 207" and the "HDD unit 205" of the print server 101 can be rephrased as the "CPU 302" and the "HDD 308" of the printing apparatus 102.

In the first exemplary embodiment, the following description will be given on the assumption that the attribute information about the sheets illustrated in the sheet holding unit information table 1100 in FIG. 11 has already been registered in the sheet holding unit information storage unit 702 in association with the sheet holding units 322. For example, the attribute information about a sheet "size: A4, grammage: 62 $g/m^2$, color: white, and type: plain paper" is registered for all the sheet holding units 322 (sheet holding units Tray1, Tray2, Tray3, and Tray4).

Next, processing for registering a setting value of the sheet holding unit 322 based on the size of the sheet held in the sheet holding unit 322 will be described with reference to a flowchart illustrated in FIG. 12. The processing is performed on the side of the printing apparatus 102. The processing is performed by the CPU 302 executing a program read from the HDD 308 and loaded into the RAM 303. The processing in FIG. 12 is started if the printing apparatus 102 and the print server 101 can communicate with each other via the network 103 such as a LAN.

In step S1201, the CPU 302 determines whether the sheet holding unit 322 is closed. The user who opens the sheet holding unit 322 to store a sheet and stores the sheet into the sheet holding unit 322 is supposed to then close the sheet holding unit 322. The CPU 302 can determine whether the sheet holding unit 322 is closed according to a signal obtained from the opening/closing detection sensor 326 in FIG. 3. In step S1201, if it is determined that the sheet holding unit 322 has been closed (YES in step S1201), the processing proceeds to step S1202. The processing of step S1201 is repeated until the sheet holding unit 322 is closed.

Figure 3:
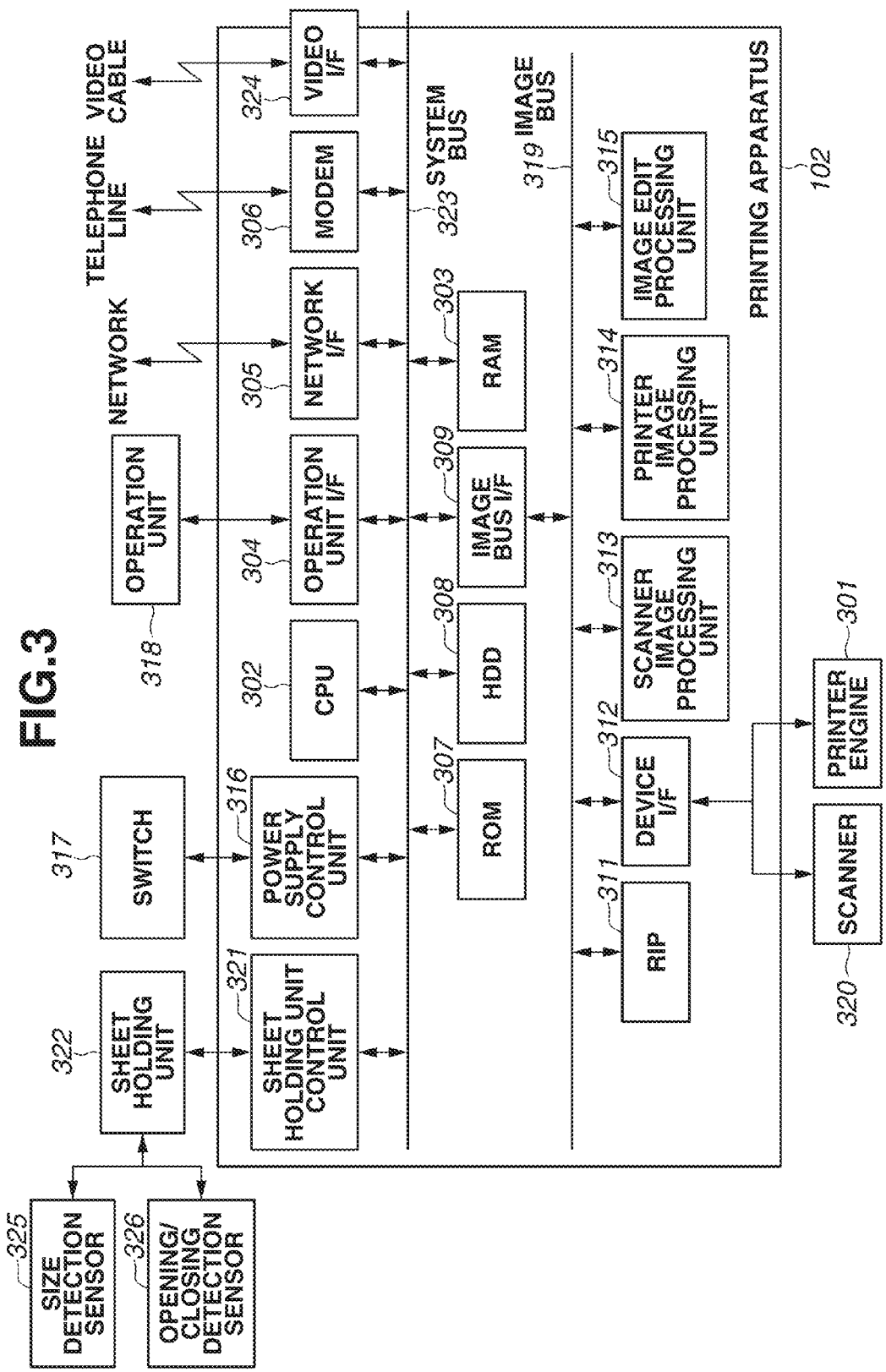
FIG. 3 is a block diagram illustrating a configuration of a printing apparatus according to the first exemplary embodiment.

In step S1202, the CPU 302 detects the size of the sheet held in the closed sheet holding unit 322 by using the size detection sensor 325 in FIG. 3. The processing proceeds to step S1203.

In step S1203, the CPU 302 transmits information for identifying the closed sheet holding unit 322 (for example, the number of the sheet holding unit 322) and the size of the sheet detected in step S1202 to the print server 101 via the network 103. The processing proceeds to step S1204. The size of the sheet transmitted by the printing apparatus 102 is information needed to determine sheet candidates based on the size from among the sheets registered in the sheet holding unit information table 1100. The information transmitted by the printing apparatus 102 in step S1203 is received by the print server 101 in step S1301 in FIG. 13 to be described below.

In step S1204, the CPU 302 determines whether a response indicating a completion of processing on the side of the print server 101 is received from the print server 101 via the network 103. If it is determined that the response has been received (YES in step S1204), the processing proceeds to step S1205. The processing of step S1204 is repeated until the response is received. The information for the printing apparatus 102 to receive in step S1204 is transmitted by the print server 101 in step S1306 in FIG. 13 to be described below.

If the response from the print server 101 is not received for a predetermined time, the CPU 302 may time out to end the series of processings according to FIG. 12. In such a case, the CPU 302 may display a non-illustrated warning screen indicating the time-out on the operation unit 318 of the printing apparatus 102 for user notification. The predetermined time for a time-out may be capable of being arbitrarily registered by the user. In the case of a time-out, the CPU 302 may display the setting screen 400 in FIG. 4A or the setting screen 410 in FIG. 4B on the operation unit 318 and accept the user's operation to register the attribute information about the sheet held in the sheet holding unit 322 as a setting value of the sheet holding unit 322.

In step S1205, the CPU 302 determines whether attribute information about a sheet to be registered as the setting value of the closed sheet holding unit 322 is received from the print server 101 via the network 103. If it is determined that the attribute information has been received (YES in step S1205), the processing proceeds to step S1206. If it is determined that the attribute information has not been received (NO in step S1205), the series of processings according to FIG. 12 ends. Examples of the case where it is determined that the attribute information has not been received in step S1205 include when there is no sheet candidate to be registered as the setting value of the sheet holding unit 322. The information for the printing apparatus 102 to receive in step S1205 is transmitted, for example, by the print server 101 in step S1305 in FIG. 13 to be described below.

In step S1206, the CPU 302 determines whether attribute information about a plurality of sheets is received from the print server 101 in step S1205. If it is determined that such attribute information has been received (YES in step S1206), the processing proceeds to step S1207. If it is determined that such attribute information has not been received (NO in step S1206), the processing proceeds to step S1209.

Figure 14:
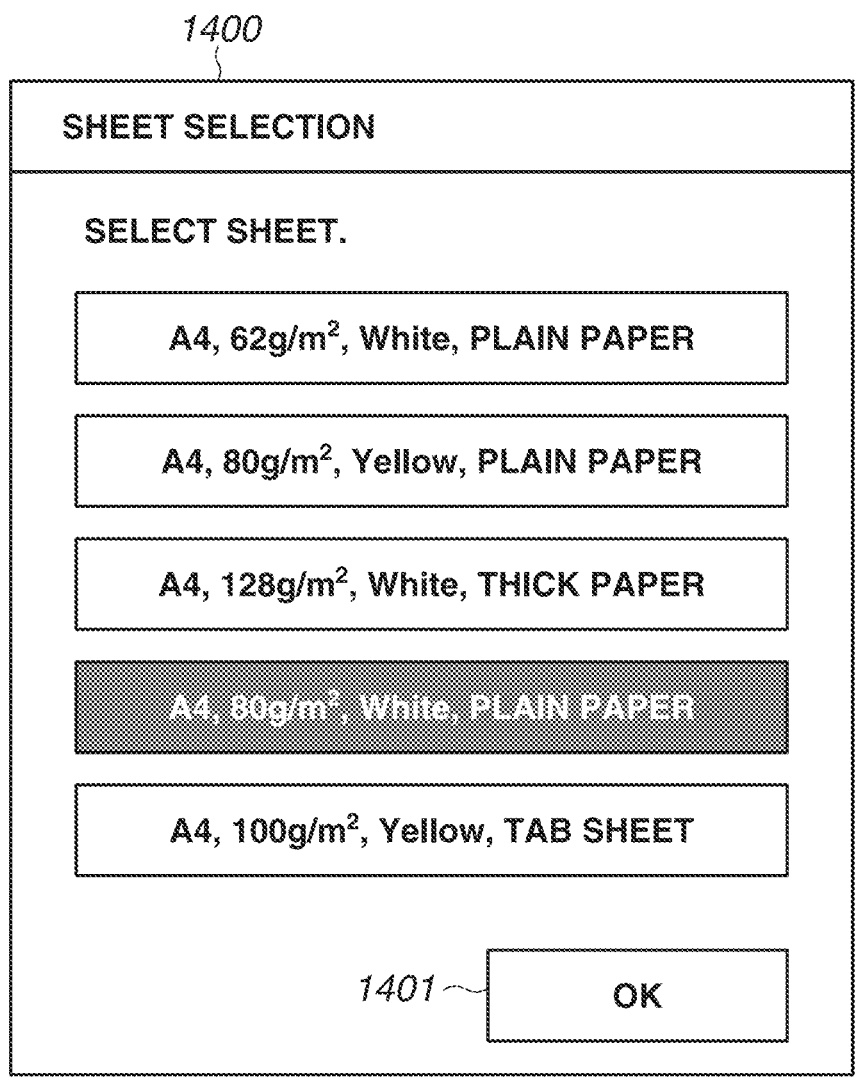
FIG. 14 is a diagram for describing a screen according to the first exemplary embodiment.

In step S1207, the CPU 302 displays a selection screen 1400 in FIG. 14 on the operation unit 318. The processing proceeds to step S1208. The attribute information about a plurality of sheets received from the print server 101 is displayed as candidates on the selection screen 1400 in FIG. 14. The user can select an arbitrary sheet from the candidates. In the example of the selection screen 1400 in FIG. 14, sheets such as "A4, 62 g/m$^2$, white, plain paper," "A4, 80 g/m$^2$, yellow, plain paper," and "A4, 80 g/m$^2$, white, plain paper" are displayed as candidates. In the illustrated state, the "A4, 80 g/m$^2$, white, plain paper" sheet is selected by the user from among the candidates to be registered as the setting value of the sheet holding unit 322.

In step S1208, the CPU 302 determines whether selection of an arbitrary sheet from among the candidates displayed on the selection screen 1400 in FIG. 14 is accepted. In order for the CPU 302 to accept the selection of an arbitrary sheet from among the candidates, the user can select an arbitrary sheet from among the candidates and press an OK button 1401 on the selection screen 1400. In step S1208, if it is determined that the selection has been accepted (YES in step S1208), the processing proceeds to step S1209. The processing of step S1208 is repeated until the selection is accepted.

In step S1209, the CPU 302 registers the attribute information about the sheet received from the print server 101 in step S1205 or the attribute information about the sheet of which the selection is accepted in step S1208 as the setting value of the closed sheet holding unit 322. The attribute information (size, grammage, type, and color) about the sheet registered as the setting value of the sheet holding unit 322 in step S1209 is provisionally stored in the HDD 308 as the setting value of the sheet holding unit 322. If an operation to settle the setting value of the sheet holding unit 322 is accepted from the user on the operation unit 318 of the printing apparatus 102, the setting value of the sheet holding unit 322 is settled and stored in the HDD 308. After the processing of step S1209, the series of processings according to FIG. 12 ends.

The above is the details of the series of processings by which the printing apparatus 102 according to the first exemplary embodiment registers the setting value of the sheet holding unit 322 based on the size of the sheet held in the sheet holding unit 322.

The printing apparatus 102 and the print server 101 may become unable to communicate with each other via the network 103 due to reasons such as power-off of the print server 101. Before starting the series of processings according to FIG. 12, the CPU 302 may determine in advance whether the printing apparatus 102 and the print server 101 can communicate with each other via the network 103. If it is determined that the printing apparatus 102 and the print server 101 is not able to communicate, the CPU 302 may display the setting screen 400 in FIG. 4A or the setting screen 410 in FIG. 4B on the operation unit 318 to accept the user's operation. In such a manner, the attribute information about the sheet may be registered as the setting value of the closed sheet holding unit 322.

Next, processing by which the print server 101 according to the first exemplary embodiment searches for a specific sheet from the sheets registered in the sheet holding unit information storage unit 702 will be described with reference to a flowchart illustrated in FIG. 13. The processing in FIG. 13 is started if the printing apparatus 102 and the print server 101 can communicate with each other via the network 103 such as a LAN.

In step S1301, the CPU 207 determines whether the information for identifying a closed sheet holding unit 322 (for example, the number of the sheet holding unit 322) and a size detected as the size of a sheet held in the sheet holding unit 322 are received from the printing apparatus 102 via the network 103. If it is determined that the information and the size have been received (YES in step S1301), the processing proceeds to step S1302. The processing of step S1301 is repeated until the information and the size are received. The information for the print server 101 to receive in step S1301 is transmitted by the printing apparatus 102 in step S1203 in FIG. 12 described above.

In step S1302, the CPU 207 refers to the attribute information about the sheets that are registered in association with the closed sheet holding unit 322 in the sheet holding unit information storage unit 702 stored in the HDD unit 205. The processing proceeds to step S1303.

In step S1303, the CPU 207 searches for sheets having a size coincident with the size of the sheet received in step S1301 among the sheets registered in the sheet holding unit information storage unit 702 in association with the closed sheet holding unit 322. The processing proceeds to step S1304.

In step S1304, the CPU 207 determines from the search result of step S1303 whether a sheet having the size coincident with the size of the sheet received in step S1301 is registered. If it is determined that such a sheet has been registered (YES in step S1304), the processing proceeds to step S1305. On the other hand, if it is determined that no such sheet has been registered (NO in step S1304), the processing proceeds to step S1306.

In step S1305, the CPU 207 transmits the attribute information about all the sheets found in step S1303 that have the size coincident with the size of the sheet received in step S1301 to the printing apparatus 102. The processing proceeds to step S1306. The information transmitted by the print server 101 in step S1305 is received by the printing apparatus 102 in step S1205 in FIG. 12 described above.

In step S1306, the CPU 207 transmits a response indicating the completion of processing on the side of the print server 101 to the printing apparatus 102 via the network 103. The information transmitted by the print server 101 in step S1306 is received by the printing apparatus 102 in step S1204 in FIG. 12 described above. After the processing of step S1306, the series of processings according to FIG. 13 ends.

The above is the details of the series of processings by which the print server 101 according to the first exemplary embodiment searches for specific sheets among the sheets registered in the sheet holding unit information storage unit 70. If the processing is performed on the side of the printing apparatus 102, the processing can be described in a manner similar to when the processing is performed on the side of the print server 101 by the following rephrasing. That is, the "CPU 207" and the "HDD unit 205" of the print server 101 can be rephrased as the "CPU 302" and the "HDD 308" of the printing apparatus 102, respectively.

As described above, the digital printing system according to the first exemplary embodiment includes the printing apparatus 102 and the print server 101 capable of communication with the printing apparatus 102. The digital printing system further includes the print management server 107 capable of communication with the print server 101, and the information processing apparatus 104.

The print server 101 inquires about the order information 507 managed by the print management server 107 to receive the printing information 509 about specific print jobs registered in the printing information table 600. The print server 101 can then automatically register the received printing information 509 (for example, the sizes of and attribute information about the sheets used by the print jobs) into the sheet information storage unit 701. This can save the user from manually registering the attribute information about each sheet into the sheet information storage unit 701. Since the user's simple operation of closing the sheet holding unit 322 can easily register the attribute information about a sheet registered in the sheet holding unit information storage unit 702 as the setting value of the sheet holding unit 322, the user's operability can be significantly improved.

A second exemplary embodiment will be described. In the foregoing first exemplary embodiment, the case has been described where a plurality of types of sheets having the same size can be registered in the sheet holding unit information storage unit 702 in association with one of the sheet holding units 322. The second exemplary embodiment below deals with the case where a plurality of types of sheets having the same size is restricted from being able to be registered in the sheet holding unit information storage unit 702 in association with one of the sheet holding units 322. The number of types of sheets that can be registered in association with one of the sheet holding units 322 is restricted to one for each size, whereby the type of sheet to be registered as the setting value of the sheet holding unit 322 can be uniquely determined based on the sheet held in the sheet holding unit 322.

In the second exemplary embodiment, a flowchart illustrating processing for registering attribute information about sheets into the sheet holding unit information storage unit 702 in associated with the sheet holding units 322 is the same as that in FIG. 10 according to the first exemplary embodiment. A description thereof will thus be omitted. A flowchart illustrating processing for registering the setting value of the sheet holding unit 322 based on the size of the sheet held in the sheet holding unit 322 is the same as that in FIG. 12 according to the first exemplary embodiment. A description thereof will thus be omitted. A flowchart illustrating processing for searching for a specific sheet among the sheets registered in the sheet holding unit information shortage unit 702 is the same as that in FIG. 13 according to the first exemplary embodiment. A description thereof will thus be omitted.

Figure 15:
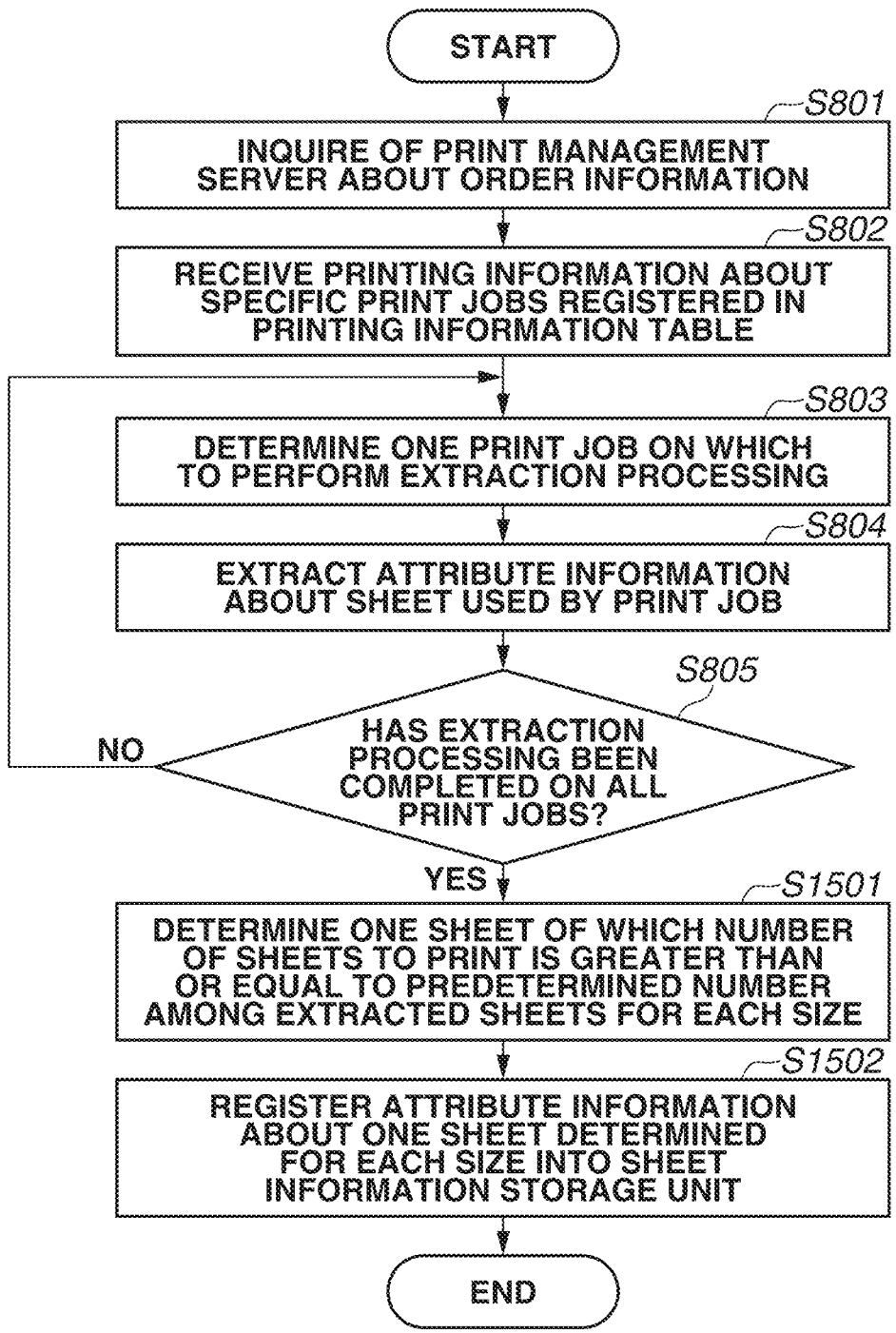
FIG. 15 is a flowchart for describing an example of control according to a second exemplary embodiment.

A series of processings by which the print server 101 according to the second exemplary embodiment registers attribute information about sheets into the sheet information storage unit 701 differs in part from that of the first exemplary embodiment (FIG. 8). Referring to FIG. 15, the processing will be described with emphasis on differences from the first exemplary embodiment. Processing common to the first exemplary embodiment is denoted by the same step numbers. A detailed description thereof will be omitted.

As illustrated in FIG. 15, if YES in step S805 (i.e., it is determined that the extraction processing of step S804 has been completed on all the print jobs received in step S802), the processing proceeds to step S1501.

In step S1501, the CPU 207 determines one sheet of which the number of sheets to print is greater than or equal to a predetermined number (for example, a sheet of which the number of sheets to print is the largest) among the sheets extracted in step S804 for each size. The processing proceeds to step S1502. Suppose, for example, that the number of sheets to print of the "A4, 62 g/m$^2$, white, plain paper" sheet is 500000, that of the "A4, 80 g/m$^2$, yellow, plain paper" sheet is 5000, and that of the "A4, 128 g/m$^2$, white, thick paper" sheet is 5000. In such a case, in step S1501, the CPU 207 determines the "A4, 62 g/m$^2$, white, plain paper" sheet of which the number of sheets to print is the largest among the sheets of A4 size extracted in step S804.

In step S1502, the CPU 207 registers the attribute information about the one sheet determined for each size (the size, grammage, color, and type of the sheet) into the sheet information storage unit 701 in FIG. 7. After the processing of step S1502, the series of processings according to FIG. 15 ends.

The above is the details of the part of the series of processings by which the print server 101 according to the second exemplary embodiment registers attribute information about sheets into the sheet information storage unknit 701, the part being different from that of the first exemplary embodiment.

In step S1502, the case has been described where one sheet of which the number of sheets to print is the largest among the sheets extracted in step S804 is determined for each size. However, this is not restrictive. The CPU 207 may determine one sheet of which the frequency of reloading into the sheet holding unit 322 is higher than or equal to a predetermined number or one sheet of which the frequency of use by print jobs is higher than or equal to a predetermined number for each size. The user may select and determine one arbitrary sheet for each size from among sheets to be used by print jobs corresponding to a delivery date specified by the user, a customer name specified by the user, and/or a device specified by the user.

As described above, in the second exemplary embodiment, a plurality of types of sheets having the same size is restricted from being able to be registered into the sheet holding unit information storage unit 702 in association with one of the sheet holding units 322. Consequently, the attribute information about the sheets is stored in the sheet information storage unit 701 in a list form such as illustrated in a sheet information table 1600 in FIG. 16. The sheet attribute information about the sheets are stored in the sheet holding unit information storage unit 702 in association with each of the sheet holding units 322 in a list form such as illustrated in a sheet holding unit information table 1700 in FIG. 17.

In the second exemplary embodiment, the sheet holding units 322 includes the size detection sensor 315 which can detect the size of a sheet. The case has been described where a plurality of sheets having the same size is restricted from being able to be registered into the sheet holding unit information storage unit 702 in association with one of the sheet holding units 322. Even if the sheet holding units 322 do not include the size detection sensor 325, similar restrictions may be imposed as long as the sizes of the sheets held in the sheet holding units 322 can be obtained.

If the sheet holding units 322 include a sensor that can detect the color, grammage, or type of a sheet, similar restrictions may be imposed, with the color, grammage, or type of the sheet being a reference, instead of the size of the sheet. Similar restrictions may also be imposed if the color, grammage, or type of the sheets held in the sheet holding units 322 can be obtained. In other words, a plurality of sheets having the same color, grammage, or type may be restricted from being able to be registered into the sheet holding unit information storage unit 702 in association with one of the sheet holding units 322.

As described above, in the digital printing system according to the second exemplary embodiment, the number of types of sheets that can be registered into the sheet holding unit information storage unit 702 in association with one of the sheet holding units 322 is limited to one for each size. The user can thus uniquely determine the attribute information about a sheet registered in the sheet holding unit information storage unit 702 and register the attribute information as the setting value of the sheet holding unit 322 by a simple operation of closing the sheet holding sheet 322.

A third exemplary embodiment will be described. In the foregoing first exemplary embodiment, in step S802, the CPU 207 identifies print jobs corresponding to a predetermined condition among all the print jobs registered in the printing information table 600. Examples of the predetermined condition include print jobs corresponding to a delivery date specified by the user, a customer name specified by the user, and a device specified by the user. In step S804, the CPU 207 then extracts the attribute information about the sheets used by the print jobs identified by the predetermined condition. In step S806, the CPU 207 registers the extracted attribute information about the sheets into the sheet information storage unit 701.

In an exemplary embodiment of the present invention, the attribute information about the sheets used by the print jobs identified by the predetermined condition has only to be controlled to be registered as the setting values of the sheet holding units 322. Such an exemplary embodiment is not limited to the foregoing first exemplary embodiment.

In the third exemplary embodiment, the processings in FIGS. 8 and 10 are then rephrased as follows.

In step S802, the CPU 207 receives the printing information 509 about all the print jobs registered in the printing information table 600. In step S804, the CPU 207 extracts the attribute information about the sheets used by all the print jobs registered in the printing information table 600. In step S806, the CPU 207 registers the attribute information about the sheets extracted in step S804 into the sheet information storage unit 701.

In step S1001, the CPU 207 identifies attribute information about sheets according to a predetermined condition among the attribute information about all the sheets registered in the sheet information storage unit 701. Examples of the predetermined condition include print jobs corresponding to a delivery date specified by the user, a customer name specified by the user, and a device specified by the user. In step S1001, the CPU 207 then obtains the attribute information about the sheets specified by the predetermined condition among the attribute information about all the sheets registered in the sheet information storage unit 701.

As a result, the attribute information about the sheets used by the print jobs specified by the predetermined condition (such as print jobs corresponding to a delivery date specified by the user, a customer name specified by the user, and a device specified by the user) is controlled to be registered as the setting values of the sheet holding units 322.

In a fourth exemplary embodiment, the processings in FIGS. 8 and 12 are rephrased as follows.

In step S802, the CPU 207 receives the printing information 509 about all the print jobs registered in the printing information table 600. In step S804, the CPU 207 extracts the attribute information about the sheets used by all the print jobs registered in the printing information table 600. In step S806, the CPU 207 registers the attribute information about the sheets extracted in step S804 into the sheet information storage unit 701.

In step S1207, the CPU 302 identifies the attribute information about the sheets used by the print jobs identified by a predetermined condition among the attribute information about the plurality of sheets received from the print server 101. Examples of the predetermined condition include print jobs corresponding to a delivery date specified by the user, a customer name specified by the user, and a device specified by the user. In step S1207, the CPU 302 then displays the attribute information about the sheets identified by the predetermined condition among the attribute information about the plurality of sheets received from the print server 101, as candidates on the selection screen 1400 in FIG. 14.

As a result, the attribute information about the sheets used by the print jobs specified by the predetermined condition (such as print jobs corresponding to a delivery date specified by the user, a customer name specified by the user, and a device specified by the user) is controlled to be registered as the setting values of the sheet holding units 322.

In a fifth exemplary embodiment, the processings in FIGS. 8 and 13 are rephrased as follows.

In step S802, the CPU 207 receives the printing information 509 about all the print jobs registered in the printing information table 600. In step S804, the CPU 207 extracts the attribute information about the sheets used by all the print jobs registered in the printing information table 600. In step S806, the CPU 207 registers the attribute information about the sheets extracted in step S804 into the sheet information storage unit 701.

In step S1305, the CPU 207 identifies the attribute information about the sheets used by the print jobs identified by a predetermined condition among the attribute information about all the sheets found in step S1303 that have the size coincident with the size of the sheet received in step S1301. Examples of the predetermined condition include print jobs corresponding to a delivery date specified by the user, a customer name specified by the user, and a device specified by the user. In step S1305, the CPU 207 then transmits the attribute information about the sheets identified by the predetermined condition among the attribute information about all the sheets found in step S1303 that have the size coincident with the size of the sheet received in step S1301 to the printing apparatus 102.

As a result, the attribute information about the sheets used by the print jobs specified by the predetermined condition (such as print jobs corresponding to a delivery date specified by the user, a customer name specified by the user, and a device specified by the user) is controlled to be registered as the setting values of the sheet holding units 322.

The present invention is not limited to the foregoing exemplary embodiments. Various modifications (including organic combinations of the exemplary embodiments) may be made based on the gist of the present invention, and such modifications are not intended to be excluded from the scope of the present invention.

For example, a size is detected (obtained) as a piece of attribute information about the sheets held in the sheet holding units 322. However, not just one but a plurality of pieces of attribute information may be detected (obtained) and transmitted. The processing of the digital printing system may proceed with the subsequent processing based on such a plurality of attribute information.

For example, the information transmitted to the print server 101 has been described to be the size of the sheets held in the sheet holding units 322. However, this is not restrictive. Suppose, for example, that the sheet holing units 322 include a sensor that can detect the color, grammage, or type of a sheet, and attribute information such as the color, grammage, or type of a sheet is registered in the sheet holding unit information storage unit 702. In such a case, attribute information about the color, grammage, or type of a sheet may be transmitted to the print server 101 together with the size of the sheet so that the CPU 207 determines the sheet based on the size of the sheet and the color, grammage, or type of the sheet. For example, attribute information such as the color of a sheet may be transmitted to the print server 101 instead of the size of the sheet so that the CPU 207 determines the sheet based only on the color of the sheet.

In other words, if attribute information including at least one of the size, grammage, color, and type of a sheet is obtained as the attribute information about the sheet held in the sheet holding unit 322, a setting value of the sheet holding unit 322 can be set to include at least one piece of attribute information other than the obtained attribute information.

The printing apparatus 102 and the external print server 101 are connected, for example, via the network 105. However, this is not restrictive. The printing apparatus 102 and a print server 101 serving as a printing control apparatus built in the printing apparatus 102 may be configured to be able to perform part or all of the foregoing various types of control. The printing apparatus 102 may be configured to be able to perform part or all of the foregoing various types of control by itself without the processing on the side of the print server 101 serving as a printing control apparatus. In other words, the print server 101 serving as a printing control apparatus may be included in the printing apparatus 102 or in the information processing apparatus 104. The printing apparatus 102 and a plurality of information processing apparatuses 104 may be configured to perform part or all of the foregoing various types of control via the network 103 such as a LAN and a WAN, or a wireless LAN.

While various examples and exemplary embodiments of the present invention have been described above, the gist and scope of the present invention are not limited to any particular description herein.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095128 filed May 2, 2014, and Japanese Patent Application No. 2015-046435 filed Mar. 9, 2015, which are hereby incorporated by reference herein in their entireties.

What is claimed is:

1. A printing control apparatus, comprising:
   a storage unit configured to store sheet sizes and sheet attributes;
   an obtaining unit configured to obtain a sheet size of a sheet stored in a sheet holding unit of a printing apparatus;
   a determining unit configured to determine, based on the sheet size obtained by the obtaining unit and the sheet sizes stored in the storage unit, at least one sheet attribute to be set for the sheet holding unit from among the sheet attributes stored in the storage unit;
   a receiving unit configured to receive, from a print job management server storing print jobs for which sheet sizes and sheet attributes are designated, designated sheet sizes and sheet attributes; and
   a registering unit configured to register, based on delivery times of the print jobs in the storage unit, the designated sheet sizes received by the receiving unit and the designated sheet attributes received by the receiving unit,
   wherein at least one of the obtaining unit, the determining unit, the receiving unit, the registering unit is implemented by at least one processor and a memory.

2. The printing control apparatus according to claim 1, further comprising:
   a display unit configured to display, in a case where the determining unit determines sheet attributes to be set for the sheet holding unit, the sheet attributes determined by the determining unit;

a selecting unit configured to select an attribute from among the sheet attributes displayed by the display unit; and a causing unit configured to cause the printing apparatus to set the sheet attribute selected by the selecting unit for the sheet holding unit.

3. The printing control apparatus according to claim 1, further comprising a causing unit configured to cause, in a case where the determining unit determines one sheet attribute to be set for the sheet holding unit, the printing apparatus to set the sheet attribute determined by the determining unit.

4. The printing control apparatus according to claim 1, wherein the receiving unit further receives the print jobs, and wherein the received print jobs are transmitted to the printing apparatus.

5. The printing control apparatus according to claim 1, wherein the attribute information includes at least one of grammage of the sheet, color of the sheet, and a type of the sheet.

6. A control method in a printing control apparatus, the control method comprising:

obtaining a sheet size of a sheet stored in a sheet holding unit of a printing apparatus;

determining, based on the obtained sheet size and sheet sizes stored in a storage unit of the printing control apparatus, at least one sheet attribute to be set for the sheet holding unit from among sheet attributes stored in the storage unit;

receiving, from a print job management server storing print jobs for which sheet sizes and sheet attributes are designated, designated sheet sizes and sheet attributes; and registering, based on delivery times of the print jobs in the storage unit, the received designated sheet sizes and the received designated sheet attributes.

7. A non-transitory computer-readable storage medium storing a computer program to cause a printing control apparatus to perform a control method, the control method comprising:

obtaining a sheet size of a sheet stored in a sheet holding unit of a printing apparatus;

determining, based on the obtained sheet size and sheet sizes stored in a storage unit of the printing control apparatus, at least one sheet attribute to be set for the sheet holding unit from among sheet attributes stored in the storage unit;

receiving, from a print job management server storing print jobs for which sheet sizes and sheet attributes are designated, designated sheet sizes and sheet attributes; and registering, based on delivery times of the print jobs in the storage unit, the received designated sheet sizes and the received designated sheet attributes.

* * * * *